(12) United States Patent
Huang

(10) Patent No.: US 7,940,483 B2
(45) Date of Patent: May 10, 2011

(54) FOCUSING DEVICE AND FOCUSING METHOD

(75) Inventor: Po-Hsuan Huang, Taipei (TW)

(73) Assignee: National Applied Research Laboratories, Taipei (TW)

( * ) Notice: Subject to any disclaimer, the term of this patent is extended or adjusted under 35 U.S.C. 154(b) by 187 days.

(21) Appl. No.: 12/150,283

(22) Filed: Apr. 24, 2008

(65) Prior Publication Data

US 2009/0168209 A1    Jul. 2, 2009

(30) Foreign Application Priority Data

Dec. 28, 2007  (TW) .............................. 96150996 A

(51) Int. Cl.
  *G02B 7/02*  (2006.01)
(52) U.S. Cl. ...................................................... 359/825
(58) Field of Classification Search .................. 359/825, 359/830, 653–655, 668–670, 676, 708–719
See application file for complete search history.

(56) References Cited

U.S. PATENT DOCUMENTS

| 5,262,889 A * | 11/1993 | Fink ............................... 359/326 |
| 6,525,699 B1 * | 2/2003 | Suyama et al. .................... 345/6 |
| 2003/0067421 A1 * | 4/2003 | Sullivan ............................ 345/6 |

* cited by examiner

*Primary Examiner* — Ricky L Mack
*Assistant Examiner* — Vipin M Patel
(74) *Attorney, Agent, or Firm* — Haverstock & Owens LLP

(57) ABSTRACT

A focusing device is provided. The focusing device has a changing focal length along a physical parameter thereof. The focusing device could be annular or in a shape of a disk. The annular focusing device has a width thereof changing with a periphery thereof, and the disk-shaped focusing device has a thickness, wherein the thickness of the disk-shaped focusing device is changing with an angular position thereof.

7 Claims, 8 Drawing Sheets

FOCUSING DEVICE AND FOCUSING METHOD

FIELD OF THE INVENTION

The present invention relates to an optical device, and more particularly to a focusing technique of the optical device.

BACKGROUND OF THE INVENTION

Focusing technique plays a crucial role among all optical devices and gear. The demand of the focusing technique lies in the varied distance between the camera lens and the light sensors (negative CCD CMOS) of optical devices and the photographed objects. For the clear imaging of a photographed object on a light sensor, the distance between the optical center of the lens and the light sensor needs to be adjusted, and such a step is the so-called focusing. Modem approaches mostly adjust focus by moving the camera lens or the lens thereinside.

Please refer to FIG. 1, which shows a schematic diagram of focusing steps of an optical device in the prior art. The optical device 1 includes a lens 11 and a light sensor 10, and the optical device 1 needs to be focused on consecutive planes from a first plane P1 to a third plane P3. To simplify the diagram, only three planes are shown therein, which includes the first plane P1, a second plane P2, and the third plane P3, wherein the first plane P1 is the one farthest to the optical device 1; the third plane P3 is the one closest to the optical device 1, and the second plane P2 is the one in the middle of the first plane P1 and the third plane P3. These three planes are used to describe the change of light path in response to different planes.

The problem for focusing in the prior art is that each lens has a certain weight, and it is a heavy work to move more than one lenses or even to move a whole lens assembly. When a user does not need to focus the optical device frequently, such a focusing method is normally appropriate. As to FIG. 1, however, a repetitive focusing is required. That is, a photographed object can be located from the first plane P1, the second plane P2 to the third plane P3, then the process starts over from the first plane P1. Consequently, in the focusing method of the prior art, it takes great effort for the lens 11 to focus the photographed objects located from the first plane P1 to the third plane P3. Furthermore, when the positions of the first plane P1, the second plane P2, and the third plane P3 are fixed, and a first object distance D1 between the lens and the first plane P1, a second object distance D2 between the lens and the second plane P2, and a third object distance D3 between the lens and the third plane P3 are also fixed, the focusing step can be preset without active or passive focus. Although the lens 11 can be moved to the preset locations, it remains problematic in the steps of "starting to move", "moving", and "ceasing to move". In the "starting to move" step, the focusing driving component needs to overcome the static friction of the focusing device. In the "moving" step, the kinetic friction of the focusing device needs to be overcome. In the "ceasing to move" step, the moving lens and lens assembly need to be stopped, i.e. the kinetic energy thereof needs to be counterbalanced. Therefore, the focusing driving component and the focusing device are mostly burdened in the "starting to move" and "ceasing to move" steps. The simplest way to overcome the mentioned problem is to use durable or expensive material to manufacture an enlarged focusing device, and thus a more powerful focusing driving component is necessary. Nevertheless, in this way, the optical device 1 would be bigger and heavier, and the cost thereof would be higher. After such a huge change in the design, the existing components and materials are useless, causing the wastage of resources.

Based on the above, in the field of auto-focusing, a resolution regarding the method, technique, and the equipment is required to focus rapidly, and to economize the use of resource and cost by utilizing existing components and materials.

SUMMARY OF THE INVENTION

In accordance with one aspect of the present invention, a disk-shaped focusing device with a thickness is provided, wherein the thickness of the focusing device is changing with an angular position thereof.

Preferably, the focusing device has a center, and the focusing device is rotatable around the center.

Preferably, the focusing device has an axis and a lateral surface parallel to the axis, and the thickness of the focusing device is increasing in an angular direction around the axis from a first edge of the lateral surface to a second edge of the lateral surface.

Preferably, the focusing device further includes a rotation center and a cliff surface having a first edge and a second edge, wherein the thickness of the focusing device is decreasing in an angular direction around the rotation center from the first edge to the second edge.

Preferably, the focusing device at the second edge has a minimum thickness.

Preferably, the cliff surface is parallel to an axis of the rotation center.

Preferably, a surface of the focusing device is a slope slanting from the first edge to the second edge.

Preferably, the focusing device is a lens.

In accordance with another aspect of the present invention, a focusing device is provided, wherein the focusing device has a changing focal length along a physical parameter thereof.

Preferably, the focusing device is annular and has a width thereof changing with a periphery thereof.

Preferably, the focusing device has a center, and is rotatable around the center.

Preferably, the focusing device has an outer surface having a first position and a second position, and a step is formed between the first position and the second position.

Preferably, the first position is relatively higher than the second position.

Preferably, the focusing device is a disk-shaped focusing device with a thickness, wherein the thickness of the focusing device is changing in a diametral direction thereof.

In accordance with a further aspect of the present invention, a focusing method is provided. The focusing method includes steps of providing a lens located on a path of a light and changing a thickness of the lens on the path.

Preferably, an image is formed by the lens, and a position of forming the image is changed when the thickness of the lens is changed.

Preferably, the focusing device further includes a step of rotating the lens, so as to change the thickness of the lens on the path.

Preferably, a focal length of the lens is changed when the thickness of the lens is changed.

Preferably, the lens is in disk-shaped and has an axis parallel to the path of the light.

Preferably, the lens is annular and has an axis perpendicular to the path of the light.

Additional objects and advantages of the invention will be set forth in the following descriptions with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 2A:
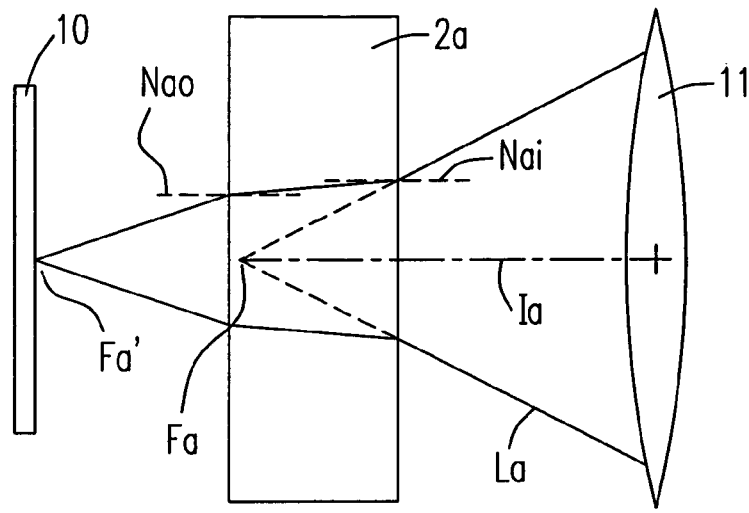
FIGS. 2A-2C are schematic diagrams showing a light refraction.
Figure 2B:
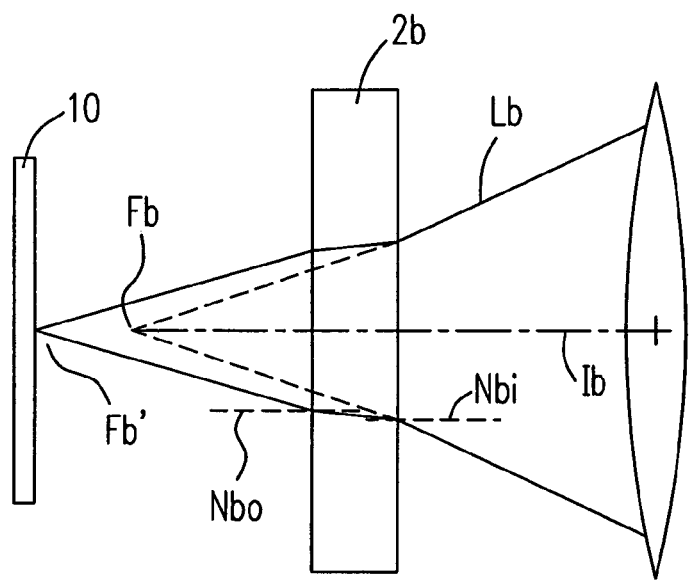
Figure 2C:
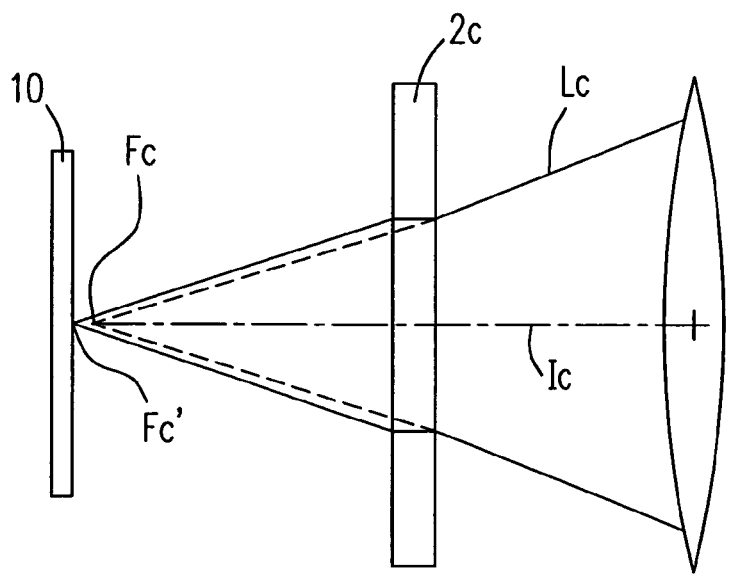

A refraction of a light occurs when the light passes through media with different refractive indexes. The present invention applies such a physical phenomenon and lets the light pass through a material with different thicknesses for focusing, wherein the principle thereof is shown in FIGS. 2A-2C.

Please refer to the following equation:

$$\Delta D = (n-1)\left(\frac{d}{n}\right),$$

wherein $\Delta D$ is focus shift, n is refractive index, and d is the thickness of the medium. Accordingly, the greater thickness results in the greater focus shift, the principle of which is shown in FIGS. 2A-2C.

Figure 1:
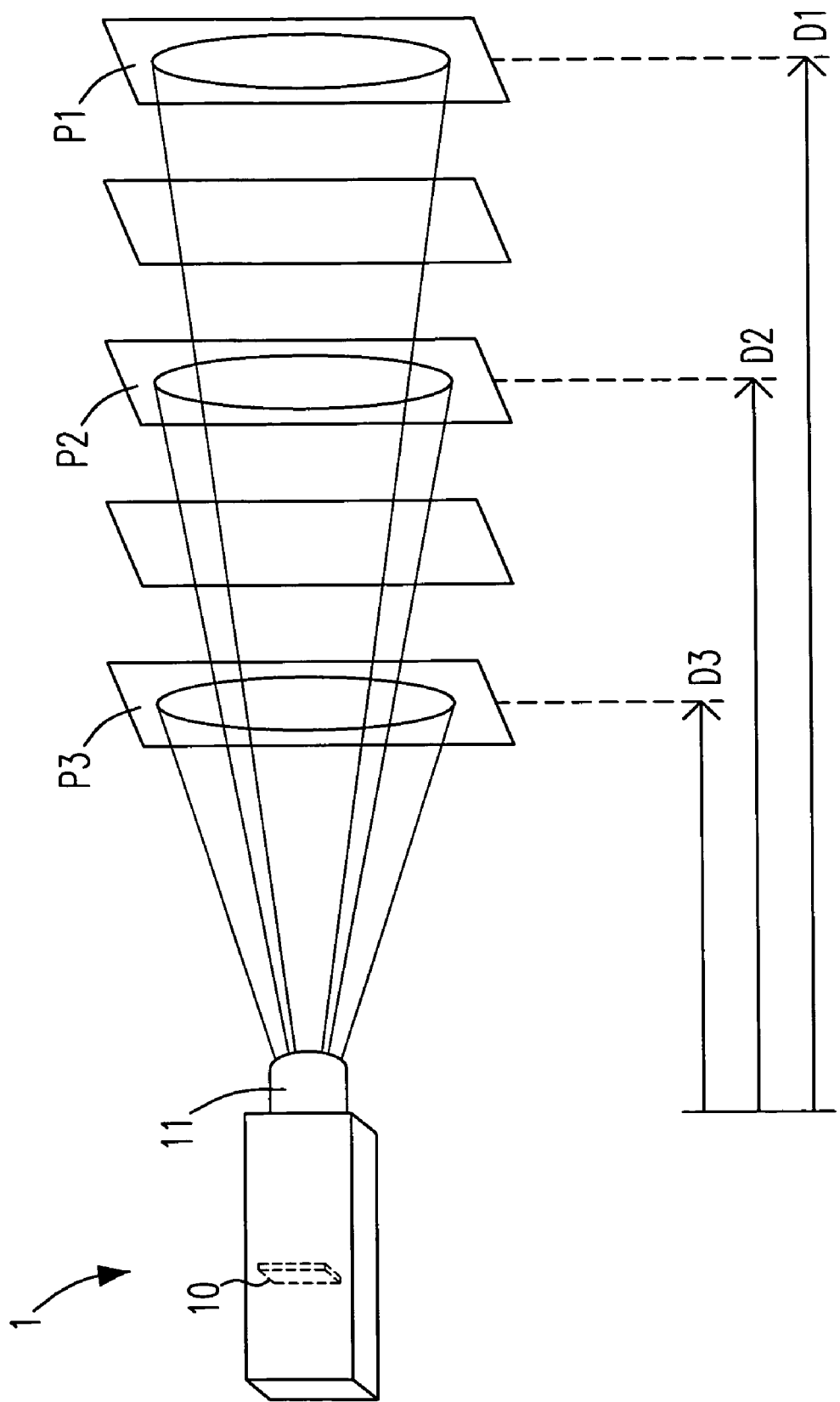
FIG. 1 is a schematic diagram showing focusing steps of an optical device in the prior art.

Please refer to FIGS. 2A-2C, which show the schematic diagrams of a light refraction. In order to avoid the problems resulting from the movement of the lens 11, the position of the lens 11 is fixed, and thus the distance between the lens 11 and a light sensor 10 remains constant. In FIG. 2A, a photographed object is at the farthest position, i.e. the position of the first plane P1 shown in FIG. 1, and the distance between the photographed object and the lens 11 is the first object distance D1. In FIG. 2B, the photographed object is at a middle position, i.e. the position of the second plane P2 as shown in FIG. 1, and the distance between the photographed object and the lens 11 is the second object distance D2. In FIG. 2C, the photographed object is at the closest position, i.e. the third plane P3 as shown in FIG. 1, and the distance between the photographed object and the lens 11 is the third object distance D3. According to the imaging principle, as the distance between the object and the lens increases, the distance between the lens and the image decreases. Therefore, the first object distance D1 in FIG. 2A (referring to FIG. 1) is longest; a first image distance Ia between the lens 11 and the image is shortest, and the distance between the light sensor 10 and a first original focal point Fa is longest. The second object distance D2 of FIG. 2B (referring to FIG. 1) is middle; a second image distance Ib between the lens 11 and the image is middle, and the distance between the light sensor 10 and a second original focal point Fb is middle. The third object distance D3 of FIG. 2C (referring to FIG. 1) is shortest; a third image distance Ic between the lens 11 and the image is longest, and the distance between the light sensor 10 and a third original focal point Fc is shortest. As shown in FIG. 2A, a focusing lens 2a is employed to increase the first image distance Ia, so as to image on the light sensor 10. Compared with a second focusing lens 2b and a third focusing lens 2c, the first focusing lens 2a is the thickest one. When a first light La enters from air into the first focusing lens 2a, which is made of glass, the first light La deflects to a first incident normal Nai because the speed of the light is slower in glass, and the light La will deflects away from a first emergent normal Nao when coming out from the first focusing lens 2a. After the refraction, the first light La forms the image clearly on the light sensor 10, i.e. on a first corrected focal point Fa'.

As shown in FIG. 2B, the second object distance D2 (referring to FIG. 1) is a middle distance, and the second image distance Ib is middle and longer than the first image distance Ia. Accordingly, a second original focal point Fb is closer to the light sensor 10 than the first original focal point Fa is. The focusing device employed in FIG. 2B is the second focusing lens 2b, which is used to increase the second image distance Ib, so as to clearly image on the light sensor 10. Because the second image distance Ib is longer than the first image distance Ia, the second focusing lens 2b is thinner than the first focusing lens 2a, but is thicker than the third focusing lens 2c. When a second light Lb enters from air into the second focusing lens 2b made of glass, the second light Lb deflects to a second incident normal Nbi because the speed of the light is slower in glass, and the light Lb will deflects away from a second emergent normal Nbo when coming out from the second focusing lens 2b. After the refraction, the second light Lb forms the image clearly on the light sensor 10, i.e. on a second corrected focal point Fb'.

As shown in FIG. 2C, the third object distance D3 (referring to FIG. 1) is longest; the third image distance Ic is longer than the first image distance Ia and the second image Ib and the distance between the light sensor 10 and a third original focal point Fc is shortest. The focusing device employed in FIG. 2C is the third focusing lens 2c, which is used to increase the third image distance Ic, so as to clearly image on the light sensor 10. Because the second image distance Ic is very long, the third focusing lens 2c is the thinnest among the focusing lenses. Similar to the principle described above, when a third light Lc enters into the third focusing lens 2c and comes out therefrom, the third light Lc forms the image clearly on the light sensor 10, i.e. on a third corrected focal point Fc', after the refraction.

Based on the above, the focusing steps can be achieved by changing the light transparent material between the lens and the light sensor besides the method of moving the camera lens. In addition, as shown in FIG. 1 and FIGS. 2A-2C, there are uncountable planes included between the first plane P1 and the third plane P3, and the step of focusing from the first plane P1 to the third plane P3 is a continuous action. As the focusing on the first plane P1 to the third plane P3, the thickness of the corresponding lens—the first focusing lens 2a to the third focusing lens—are getting thinner. Such a change of the thickness can be achieved by a single lens with changeable thickness, so as to achieve the focusing step.

Figure 3:
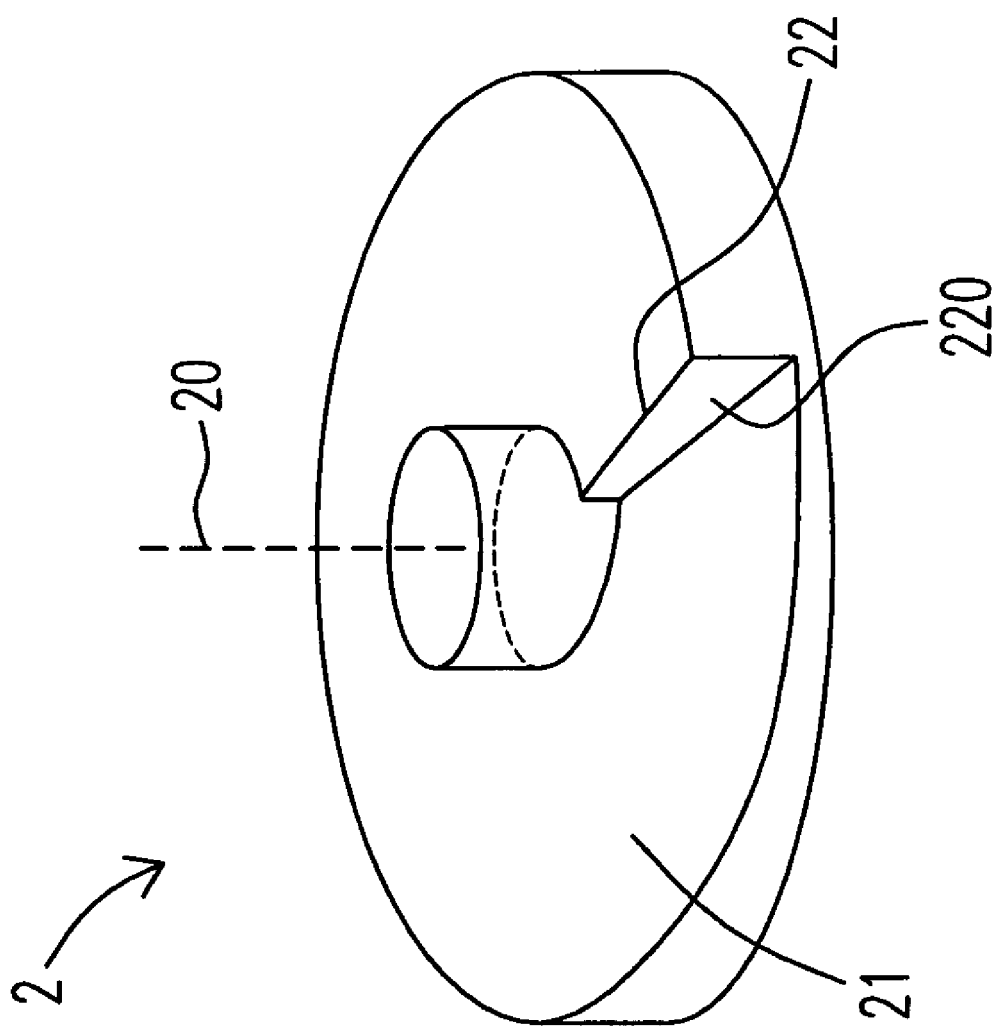
FIG. 3 is a schematic diagram of the focusing lens according to a preferred embodiment of the present invention.

Please refer to FIG. 3, which is a schematic diagram of the focusing lens according to a preferred embodiment of the present invention. The focusing lens 2 is a disk-shaped focusing device 21, wherein the thickness of the focusing device 21 is changing with an angular position thereof. The focusing device 21 has an axis 20, and the focusing device is rotatable around the axis 20. As shown in FIGS. 1 and 2A-2C, the order of the focusing step returns to the first plane P1 right after the third plane P3, and the focusing lens 2 also has a structure to achieve the mentioned purpose. The disk-shaped focusing device 21 has an initiation position 22 with a lateral surface 220 parallel to the axis 20, wherein the focusing device 21 has a maximum thickness at one edge of the lateral surface 220, and has a minimum thickness at another edge thereof. The thickness of the focusing device 21 is changing in an angular direction around the axis 20 from the initiation position 22. Looking the focusing lens 2 from a vertical view, the thickness thereof is decreasing in a counterclockwise direction from the initiation position 22; namely the thickness thereof is increasing in a clockwise direction from the initiation position 22. Therefore, the axis 20 is the rotation center of the focusing device 21, and the surface of the focusing device 21 is a slope 23 slanting around the rotation center 20 from one edge to another edge of the lateral surface 220.

Figure 4:
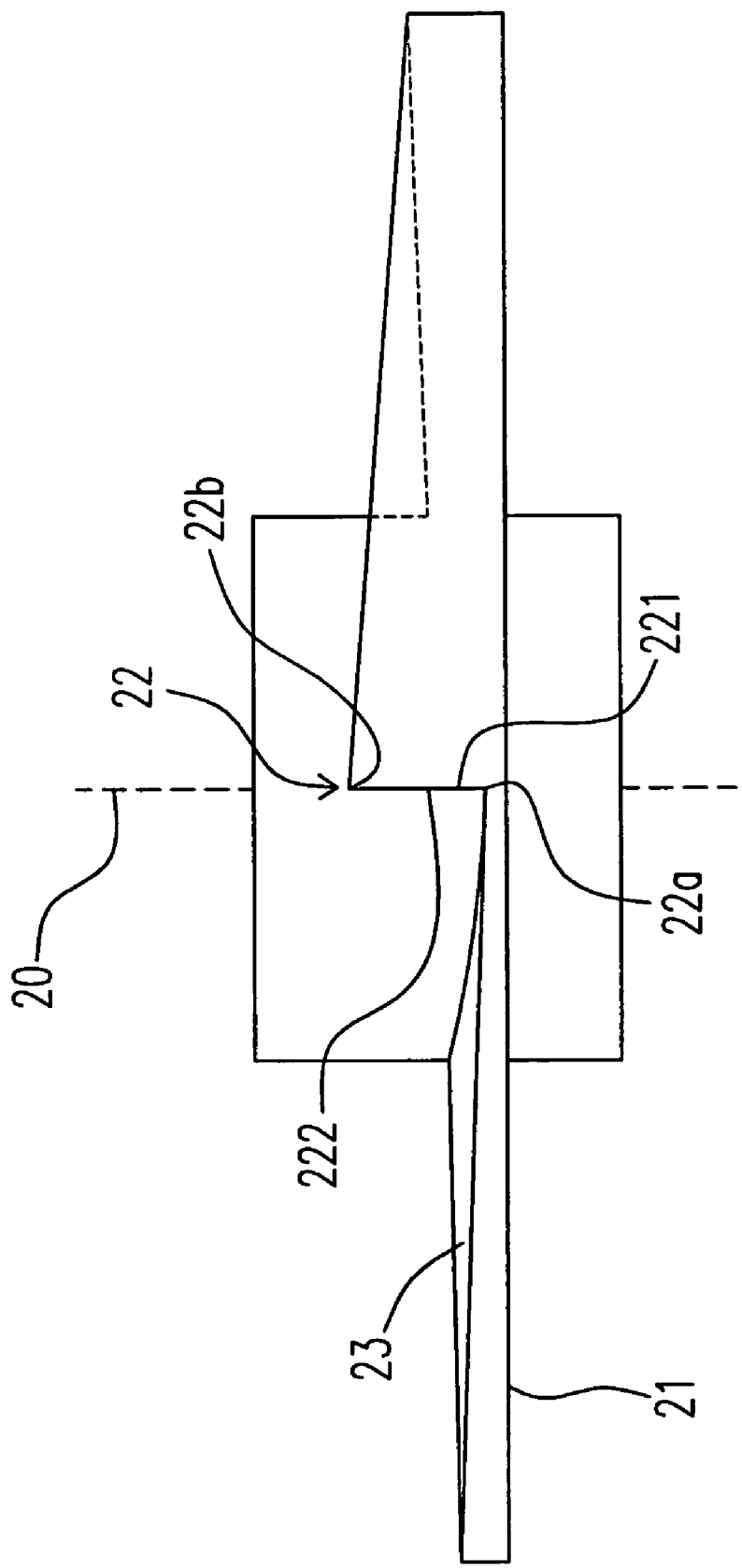
FIG. 4 is a lateral view of the focusing lens according to a preferred embodiment of the present invention.

Please refer to FIG. 4, which is a lateral view of the focusing lens according to a preferred embodiment of the present invention. The structure of the initiation position 22 shown in FIG. 3 is like a cliff, and thus the lateral surface 220 can be called a cliff surface. The cliff surface 220 shown in FIG. 4 has a bottom edge 22a and a top edge 22b, and the cliff surface 220 is formed along the axial direction of the axis 20 between the cliff bottom 22a and the cliff top 22b. The cliff surface 220 has a first side 221 and a second side 222, and the thickness of the focusing device 21 is decreasing in an angular direction around the axis 20 from the top edge 22b of the first side to the bottom edge 22a of the second side 222.

Figure 5C:
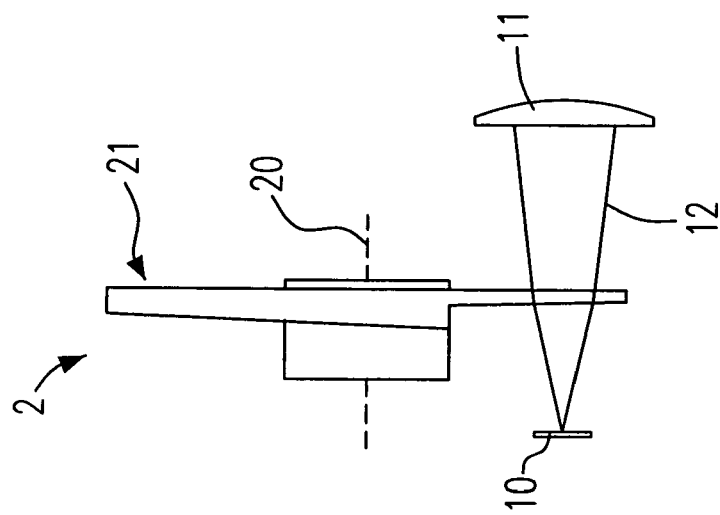
FIGS. 5A-5C show the operations according to a preferred embodiment of the present invention.
Figure 5B:
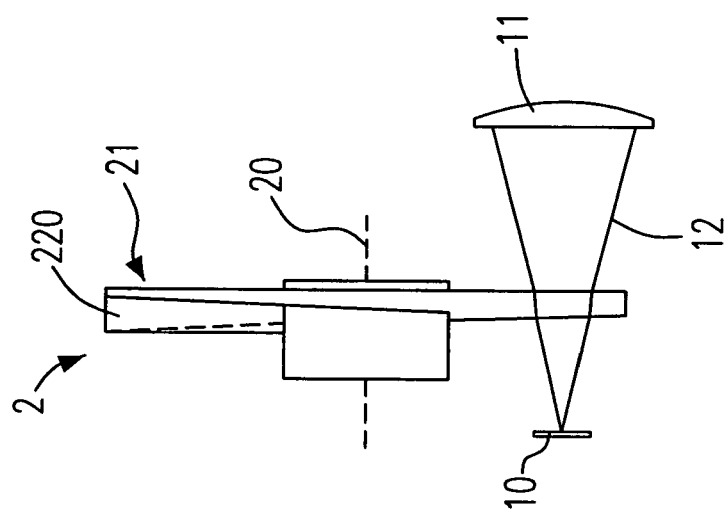
Figure 5A:
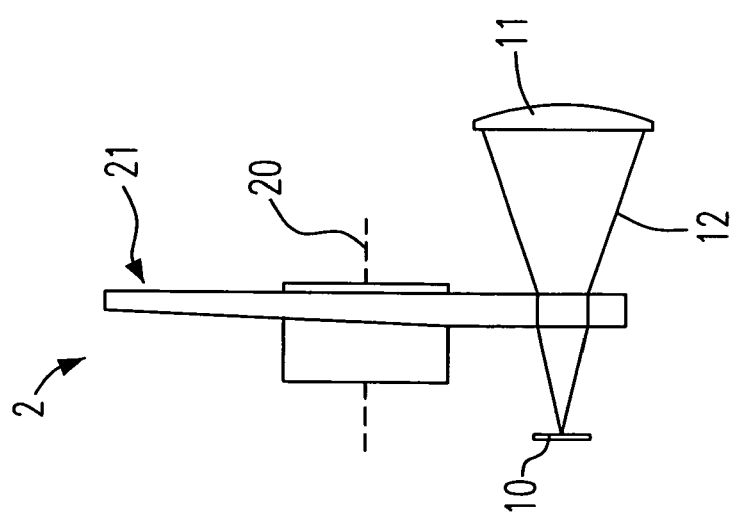

Please refer to FIGS. 5A-5C, which show the operations according to a preferred embodiment of the present invention as shown in FIGS. 3 and 4; FIGS. 5A-5C respectively show the focusing device 21 rotating to different positions, such that the focusing device can comply with different object distances, so as to focus clearly. Please refer to FIGS. 1, 2A and 5A, wherein FIG. 2A shows the thickest focusing lens, i.e. the first focusing lens 2a, when the object is located at the farthest position, and the object distance is the first object distance D1 as shown in FIG. 1. Further refer to FIGS. 3 and 4, the first focusing lens 2a is equal to the thickest region of the focusing device 21 as shown in FIGS. 3 and 4. Therefore, when the photographed object is located at the first plane P1, the focusing device 21 is rotated to a position where the thickest region thereof is located between the lens 11 and the light sensor 10, so as to achieve the function of the first focusing lens 2a as shown in FIG. 2A.

Please refer to FIGS. 1, 2B and 5B, wherein FIG. 2B shows the focusing lens with middle thickness thinner than the thickness of the first focusing lens 2a, i.e. the second focusing lens 2b, when the object is located at a middle position, and the object distance is the second object distance D2 as shown in FIG. 1. Further refer to FIGS. 3 and 4, the second focusing lens 2b is equal to a middle region with middle thickness of the focusing device 21 as shown in FIGS. 3 and 4. Therefore, when the photographed object is located at the second plane P2, the focusing device 21 is rotated to a position where the middle region thereof is located between the lens 11 and the light sensor 10, so as to achieve the function of the second focusing lens 2b as shown in FIG. 2B.

Please refer to FIGS. 1, 2C and 5C, wherein FIG. 2C shows the focusing lens with thinnest thickness compared with the first and second focusing lenses 2a and 2b, i.e. the third focusing lens 2c, when the object is located at a closest position, and the object distance is the third object distance D3 as shown in FIG. 1. Further refer to FIGS. 3 and 4, the third focusing lens 2c is equal to the thinnest region of the focusing device 21 as shown in FIGS. 3 and 4. Therefore, when the photographed object is located at the third plane P3, the focusing device 21 is rotated to a position where the thinnest region thereof is located between the lens 11 and the light sensor 10, so as to achieve the function of the third focusing lens 2c as shown in FIG. 2C.

Based on the above, the focusing method becomes to include cyclic steps by rotating a rotor with changing thickness. When the location of the photographed object is changed from the third plane P3 to the first plane P1, the focusing step could be accomplished by rotating the focusing device 21 of FIG. 5C in the same direction. Namely, when the focusing device 21 of FIG. 5C keeps rotating, the thickest region thereof will rotate to the light path immediately as shown in FIG. 5A, and thus the optical device 1 can be focused on the object on the first plane P1 (referring to FIG. 1). Therefore, when the focusing device 21 rotates in a certain direction, the optical device 1 can be focused on the planes repeatedly in a sequence of the first plane P1, the second plane P2, and the third plane P3, wherein the relative distance between the lens 11 and the light sensor 10 still remains the same. On the contrary, the focusing method in the prior art depends on the distance change between the light sensor and the lens (i.e. the optical center of the lens). When the photographed object shifts from the third plane P3 to the first plane P1, the focus method in the prior art must go through the steps of focusing on the first plane P1, the second plane P2, and the third plane P3, and such a method is time-consuming and will increase the wear of the focusing device.

Figure 6:
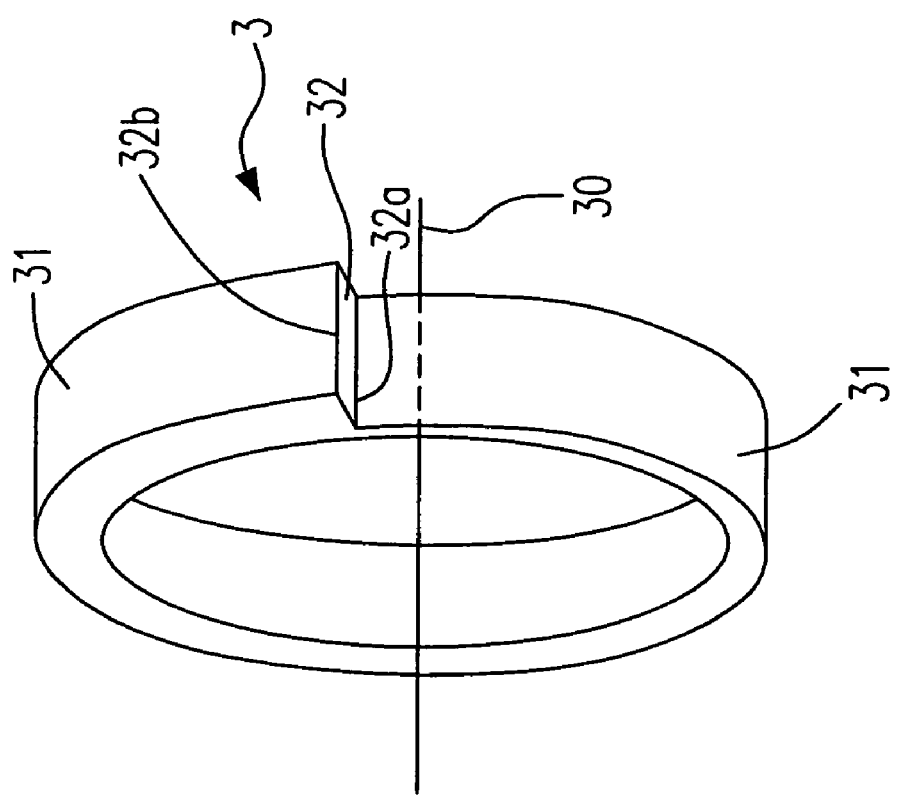
FIG. 6 is a schematic diagram of the focusing lens according to another preferred embodiment of the present invention.

Please refer to FIG. 6, which is a schematic diagram of the focusing lens according to another preferred embodiment of the present invention. The focusing lens 3 is an annular focusing device 3 having a width thereof changing with a periphery thereof. The annular focusing device 3 also has a center as an axis 30, and it is rotatable around the axis 30. The focusing method is achieved by rotating the annular focusing device 3 and changing the width of the annular focusing device located between the light sensor 10 and the lens 11 (referring to FIG. 7). The annular focusing device 3 further has an outer surface 31 with a low position 32a and a high position 32b, and a step 32 is formed between the low position 32a and the high position 32b. The width of the annular focusing device 3 is increasing from the low position 32a along the periphery thereof to the high position 32b. The step 32 is also like a cliff surface, and the outer surface 31 is like a slope slanting from the low position 32a to the high position 32b.

Figure 7:
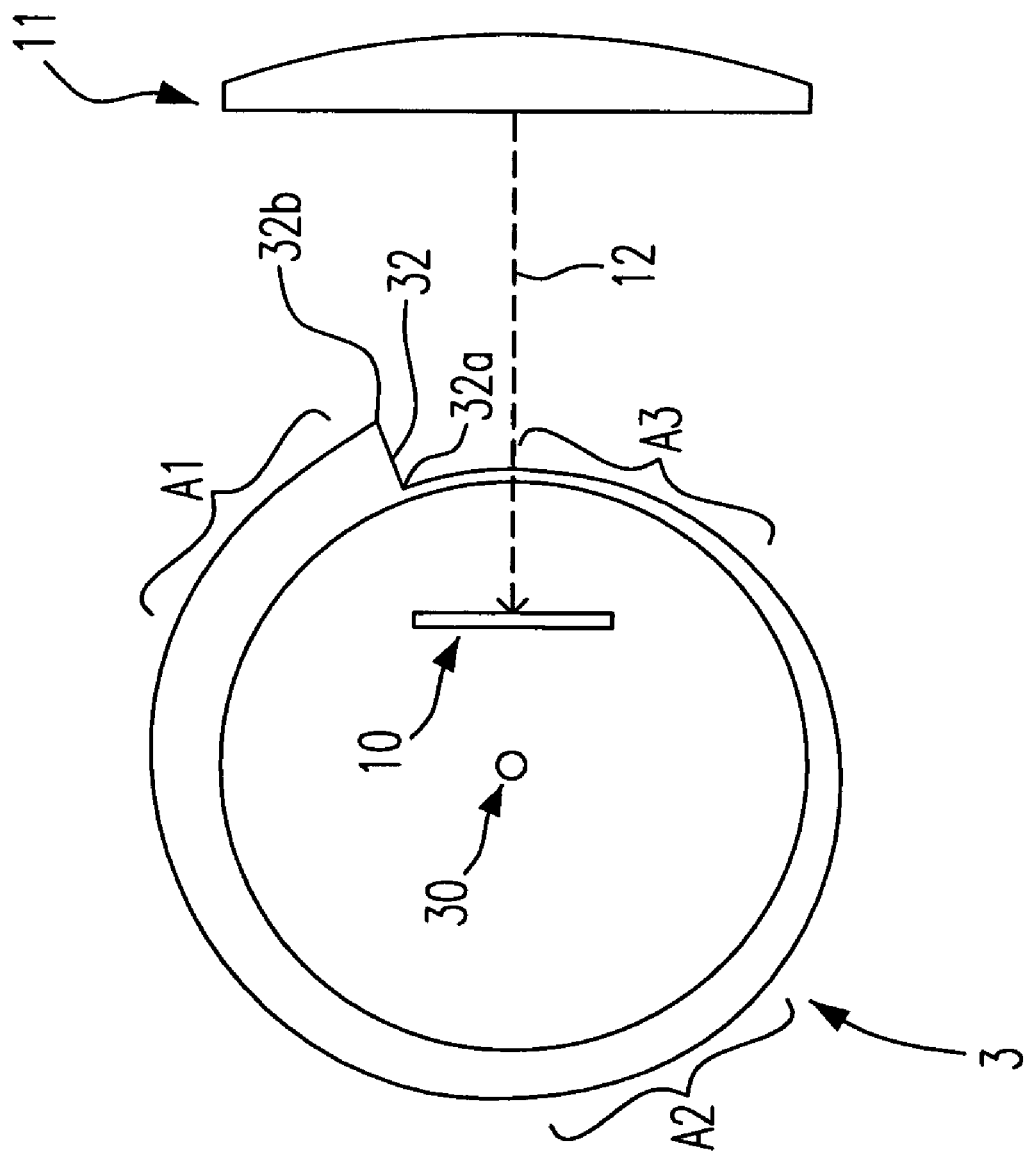
FIG. 7 shows the operation according to another preferred embodiment of the present invention.

Please refer to FIG. 7, which shows the operation according to the preferred embodiment of FIG. 6 of the present invention. The annular focusing device 3 is deposed between the lens 11 and the light sensor 10 of the optical device 1 as shown in FIG. 1. That is, the annular focusing device 3 is deposed on the light path 12, and thus the light passes through the lens 11 and the annular focusing device 3 before arriving on the light sensor 10. The annular focusing device 3 includes a first region A1 with the thickest width, a second region A2 with a middle width, and a third region A3 with the thinner width. Please further refer to FIGS. 1 and 2A-2C. The first region A1 is suitable for the optical device 1 to be focused on the object on the first plane P1 with the first object distance D1; the second region A2 is suitable for the optical device 1 to be focused on the object on the second plane P2 with the second object distance D2, and the third region A3 is suitable for the optical device 1 to be focused on the object on the third plane P3 with the third object distance D3. When the optical device 1 needs to be focused on the planes in a sequence of the first plane P1 to the third plane P3, the annular focusing device 3 of FIG. 7 is rotated in the clockwise direction.

Figure 8:
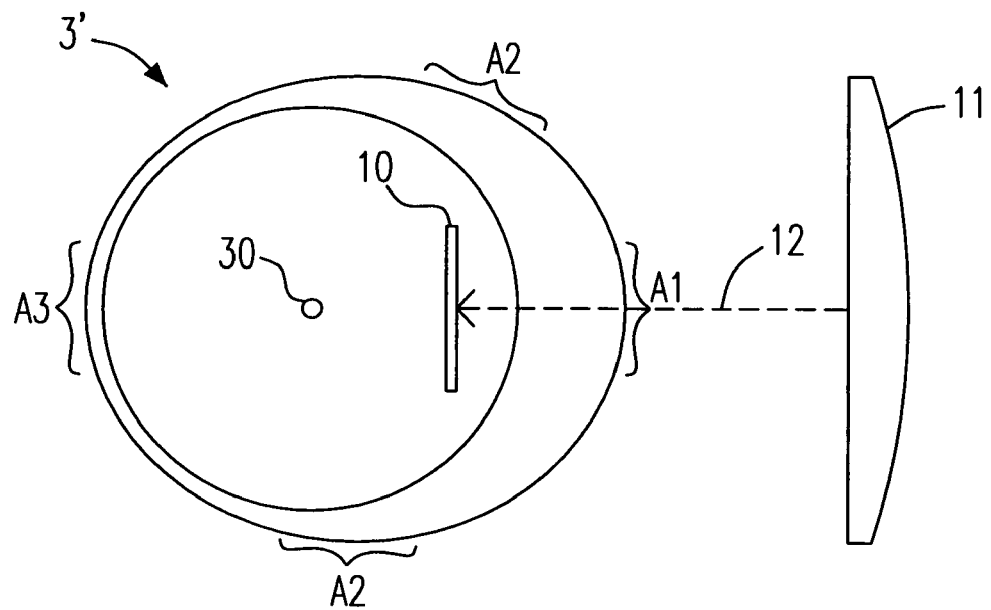
FIG. 8 is a schematic diagram of the focusing lens according to a further preferred embodiment of the present invention.

Please refer to FIG. 8, which is a schematic diagram of the focusing lens according to a further preferred embodiment of the present invention. Similar to the focusing device 3 shown in FIG. 7, the annular focusing device 3' has a center 30 as an axis, and is deposed between the light sensor 10 and the lens 11 and is located on the light path 12. The annular device 3' includes a first region A1 with the thickest width, a second region A2 with a middle width, and a third region A3 with the thinner width. Please further refer to FIGS. 1 and 2A-2C. The first region A1 is suitable for the optical device 1 to be focused on the object on the first plane P1 with the first object distance D1; the second region A2 is suitable for the optical device 1 to be focused on the object on the second plane P2 with the second object distance D2, and the third region A3 is suitable for the optical device 1 to be focused on the object on the third plane P3 with the third object distance D3.

Please refer to FIG. 8 again. Compared with the focusing device 3, the annular focusing device 3' does not have a step formed on the outer surface thereof, and thus the width thereof does not change immediately. The width of the annular focusing device 3' is gradually increasing from the third region A3 to the second region A2, and to the first region A1, and is gradually decreasing from the first region A1 to the second region A2, and to the third region A3. Please further refer to FIG. 1; no matter the focusing device 3' is rotated in clockwise or counterclockwise direction, the region located on the light path 12 is changing in a sequence of the first region A1, the second region A2, and then the third region A3, and the optical device 1 is focused on the first plane P1, the second plane P2, and the third plane P3, respectively. When the focusing device 3' keeps rotating, the region located on the light path 12 will change from the third region A3 to the second region A2, and to the first region A1 again, and thus the optical device 1 can be focused on the planes in a sequence of the third plane P3, the second plane P2, and then the first plane P1. Unlike the embodiments shown in FIGS. 3 and 6, the optical device 1 can only focused on the planes in the sequence of the first plane P1, the second plane P2, and then the third plane P3 when rotating in a counterclockwise direction.

Figure 9:
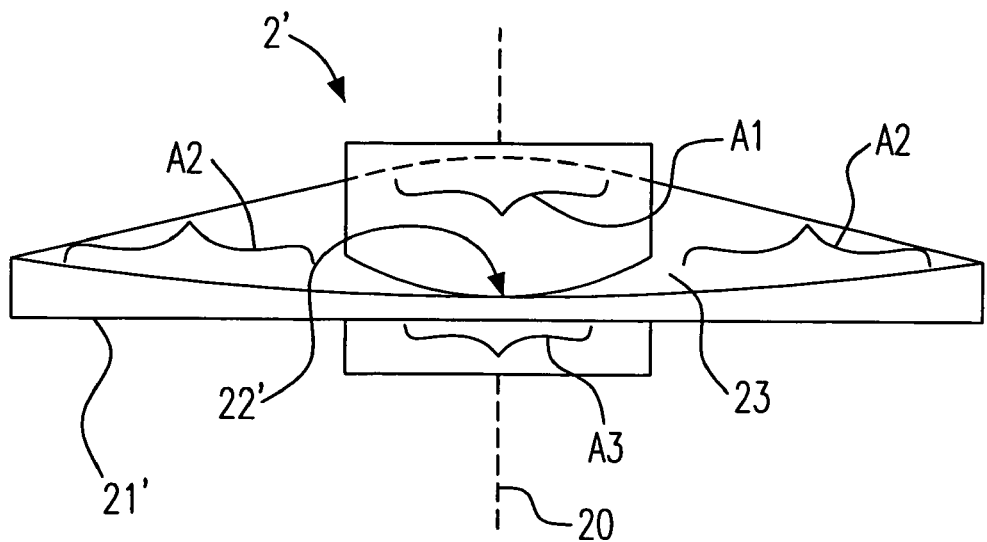
FIG. 9 is a schematic diagram of the focusing lens according to another further preferred embodiment of the present invention.

Please refer to FIG. 9, which is a schematic diagram of the focusing lens according to another further preferred embodiment of the present invention. Similar to the focusing device 21 shown in FIG. 3, the disk-shaped focusing device 21' shown in FIG. 9 has an axis 20, and includes a thickest region A1, a middle region A2 with middle thickness, and a thinnest region A3, which are suitable for the optical device 1 to be focused on the first plane P1, the second plane P2 and the third plane P3, respectively. However, the focusing device 21' does not have the lateral surface 220, and the thickness of the focusing device 21' is increasing in a diametral direction thereof from the thinnest region A3 to the thickest region A1. Namely, the focusing device 21' is like a slope slanting from an initiation position 22' to the thickest region A1. Please refer to FIGS. 5A-5C and replace the focusing device 21 by the focusing device 21'. When the thickest region A1 of the focusing device 21' is located on the light path 12, the optical device 1 can be focused on the first plane P1. When the focusing device 21' rotates, the middle region A2 will be the next one located on the light path 12, the optical device 1 can be focused on the second plane P2. After the middle region A2, the thinnest region A3 will be the next one located on the light path 12, and the optical device 1 can be focused on the third plane P3. Therefore, the optical device 1 is focused on the planes in a sequence of the first plane P1, the second plane P2, and then the third plane P3. Moreover, when the focusing device 21' keeps rotating, the middle region A2 will be located on the light path 12 again after the thinnest region A3, and the thickest region A1 will be the next one after the middle region A2. That is to say, the optical device 1 also can be focused on the planes in a sequence of the third plane P3, the second plane P2, and then the first plane P1, by employing the focusing device 21'.

Based on the above, an optical device employing the focusing devices 3' and 21' can be focused on an object moving back and force between a far plane and a close plane. On the contrary, an optical device employing the focusing devices 21 and 3, which have the lateral surface 220 or the step 32 on the outer surface, can immediately change its focus from a far plane to a close plane.

Furthermore, besides rotating in a single direction, the focusing device of the present invention also can change the rotation direction anytime, so as to comply with the requirements of general cameras, such as a still picture camera or a moving picture camera. In this situation, the focusing device of the present invention can be coupled to a distance measuring device, which provides the data used to control the rotating speed and the rotation angle of the focusing device. Hence, the focusing device can be rotated with an appropriate angle, such that the camera is clearly focused on the object to be photographed.

In conclusion, the present invention applies the refraction principle by changing the thickness of a medium, so as to change the position where the image is formed. In other words, the present invention is achieved by changing the thickness of the focusing lens, wherein the thickness is changing in a direction parallel to the light path. In addition, the embodiments shown in FIGS. 3-4 and 6, which have the lateral surface or the step structure, provide a quick switch of focusing between a far object and a close object. The optical device employing the focusing device of the present invention, such as a video camera, can precisely focus without changing the distance between the lens and the light sensor thereof. Therefore, in the present invention, the energy cost is less than the prior art, and it is unnecessary to use the materials or technology of the higher quality to manufacture other assisting elements, such as the motor, the driving wheels, etc., and thus it is cost-saving and labor-saving.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A focusing device having a changing focal length along a path of light, the focusing device comprising a ring having a periphery, a rotating axis and a width gradually and continuously changing around the periphery, wherein the width has a direction perpendicular to that of the rotating axis, and the light penetrates the ring through the direction of the width.

2. A focusing device according to claim 1, wherein the focusing device has a center, and is rotatable around the center.

3. A focusing device according to claim 1, wherein the focusing device has an outer surface having a first position and a second position, and a step is formed between the first position and the second position.

4. A focusing device according to claim 3, wherein the first position is relatively higher than the second position.

5. A focusing method, comprising steps of:
   providing a focus device located on a path of a light, wherein the focus device includes a ring having a periphery, a width and a rotating axis perpendicular to the path of the light, and the width is gradually and continuously changing around the periphery and has a direction perpendicular to that of the rotating axis; and
   rotating the ring around the rotating axis so as to change a focus length of the focus device on the path, wherein the light penetrates the ring through the direction of the width.

6. A focusing method according to claim 5, wherein an image is formed by the lens, and a position of forming the image is changed when the width of the lens is changed.

7. A focusing method according to claim 5, wherein a focal length of the lens is changed when the width of the lens is changed.

* * * * *